United States Patent

[11] 3,609,315

| | | |
|---|---|---|
| [72] | Inventor | Waldo I. Rogers<br>Arcadia, Calif. |
| [21] | Appl. No. | 839,394 |
| [22] | Filed | July 7, 1969 |
| [45] | Patented | Sept. 28, 1971 |
| [73] | Assignee | California Computer Products, Inc.<br>Anaheim, Calif. |

[54] AUTOMATIC DRAFTING CONTROL
8 Claims, 17 Drawing Figs.

[52] U.S. Cl. .................................................. 236/151.1,
318/603, 235/92
[51] Int. Cl. ...................................................... G05b 19/30
[50] Field of Search .......................................... 235/151
PL, 151.1, 92 (23 U); 318/603; 346/29

[56] References Cited
UNITED STATES PATENTS

| 3,139,570 | 6/1964 | Jacobson et al. ............. | 235/92 |
| 3,299,432 | 1/1967 | Cutler ........................... | 346/29 |
| 3,400,314 | 9/1968 | Wilson ......................... | 318/603 |
| 3,438,049 | 4/1969 | Polster ......................... | 346/29 |
| 3,500,023 | 3/1970 | Arrowood et al. ............ | 235/92 |

FOREIGN PATENTS

| 700,253 | 12/1964 | Canada ......................... | 318/603 |

OTHER REFERENCES

" Parameter Plotting Apparatus," Lee, 3-31-69 Technical Notes, a Publication of RCA TN No. 826

*Primary Examiner*—Eugene G. Botz
*Attorney*—White and Haefliger

ABSTRACT: The invention concerns numerical control of drafting head movement in an X–Y coordinate system, wherein rapid and precise travel of the head to desired position, or over a range of positions, is achieved. Control apparatus is connected to be responsive to directing (input) and feedback pulses to change the count in a counter so as to control the drive of the head to desired position; and the control apparatus includes logic means responsive to timewise nearly coincident directing and feedback pulses to provide an output discriminating the nearly coincident pulses and operable to control passage of pulses to the counter.

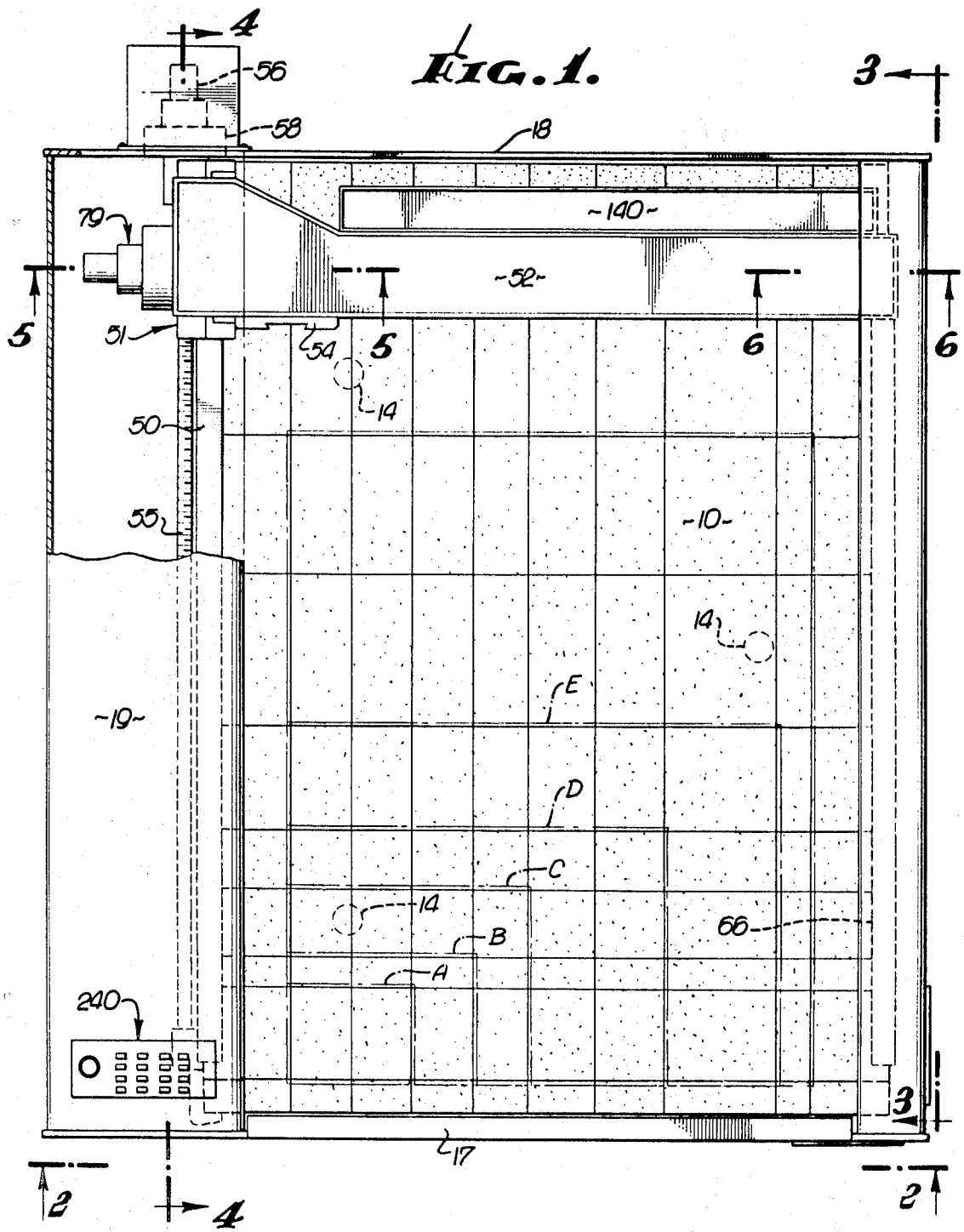

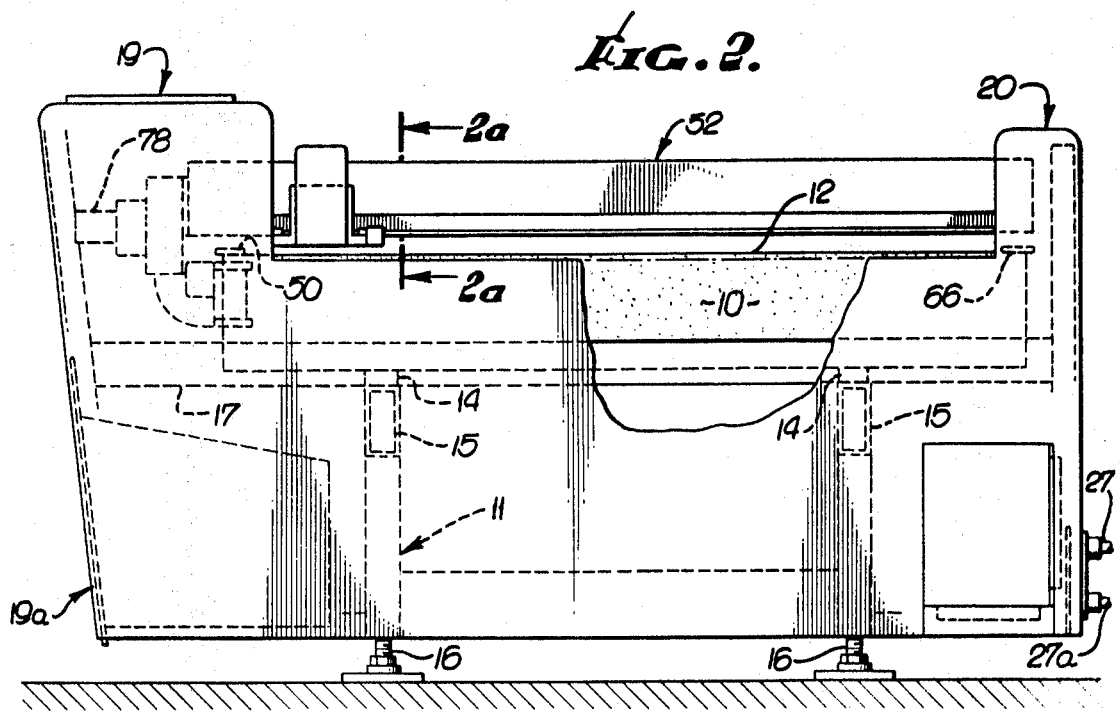
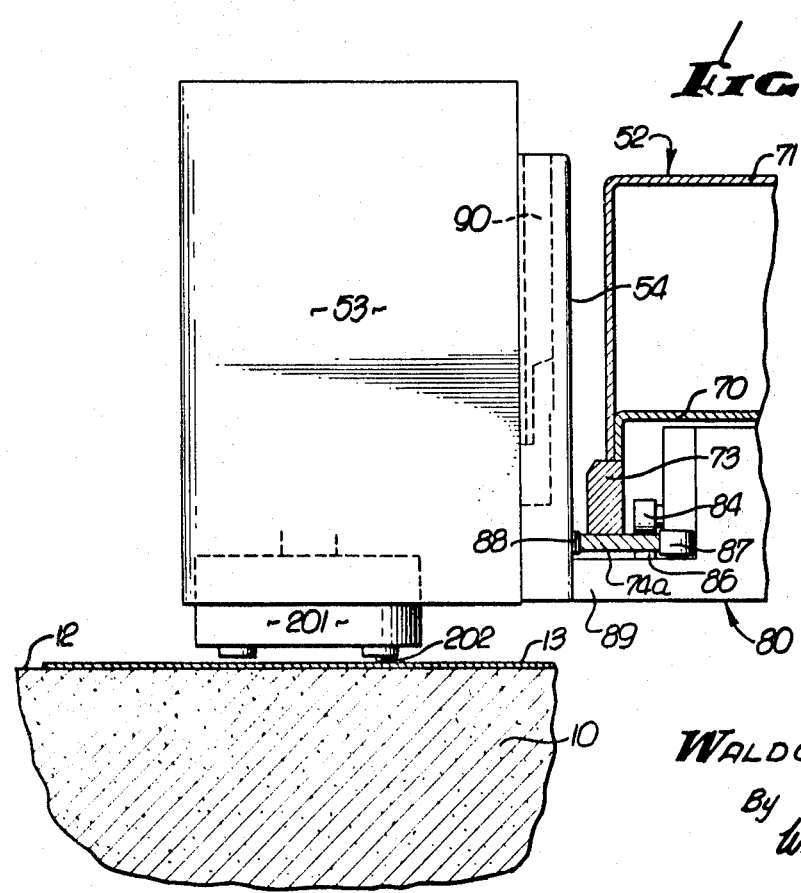

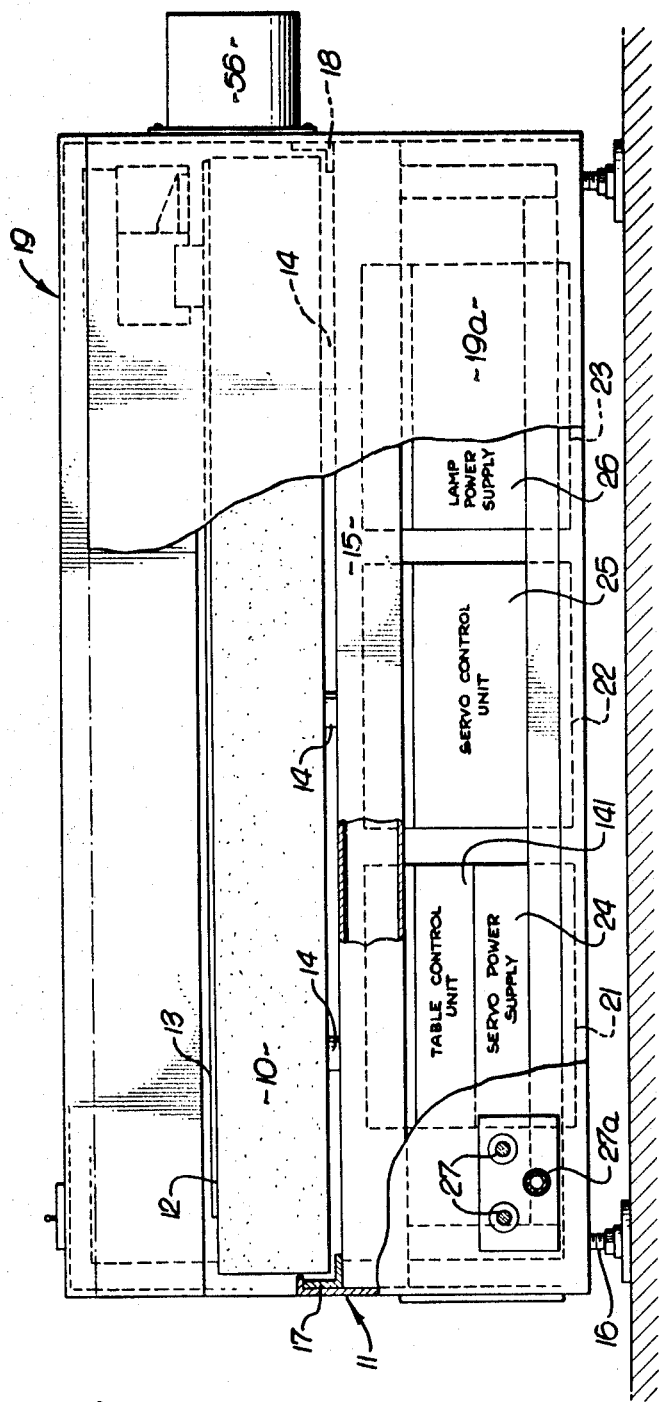

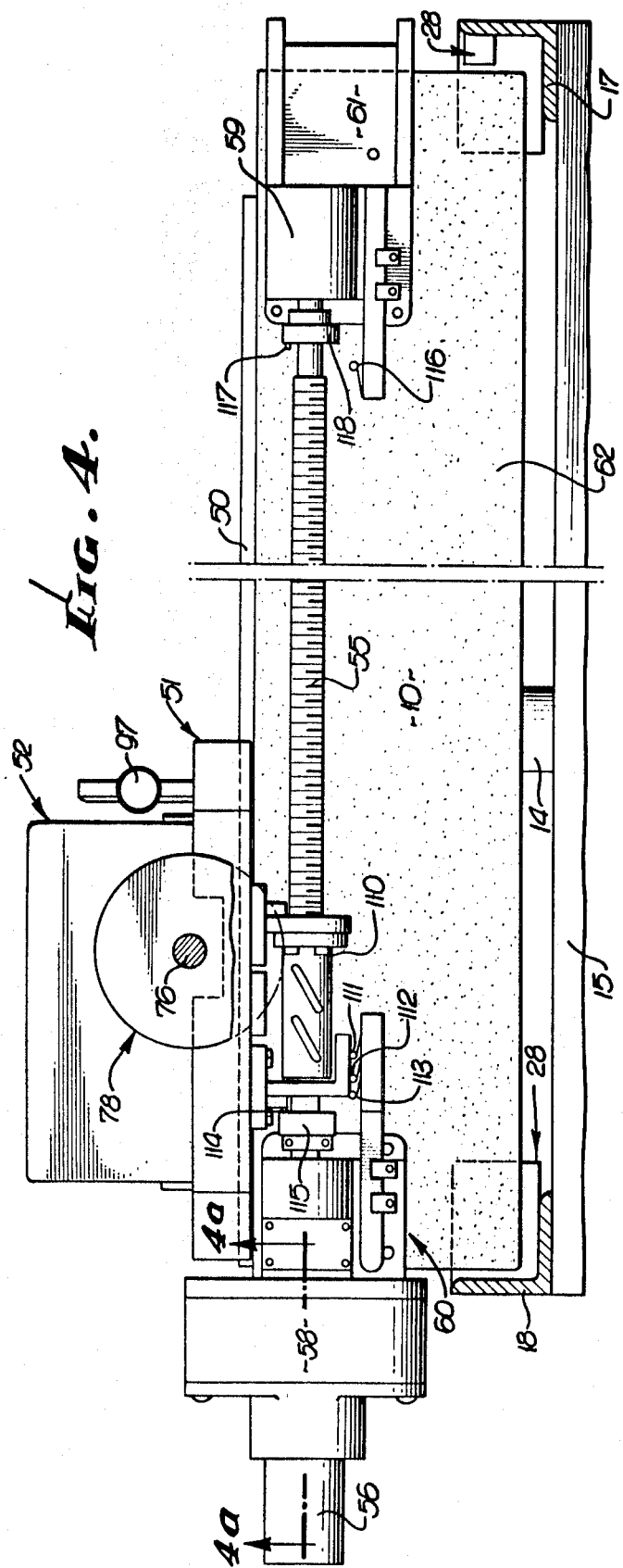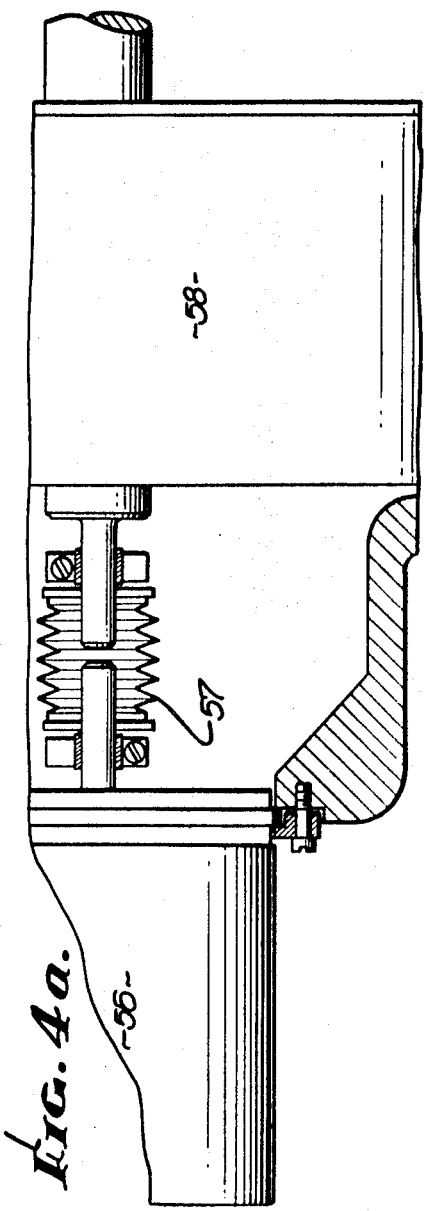

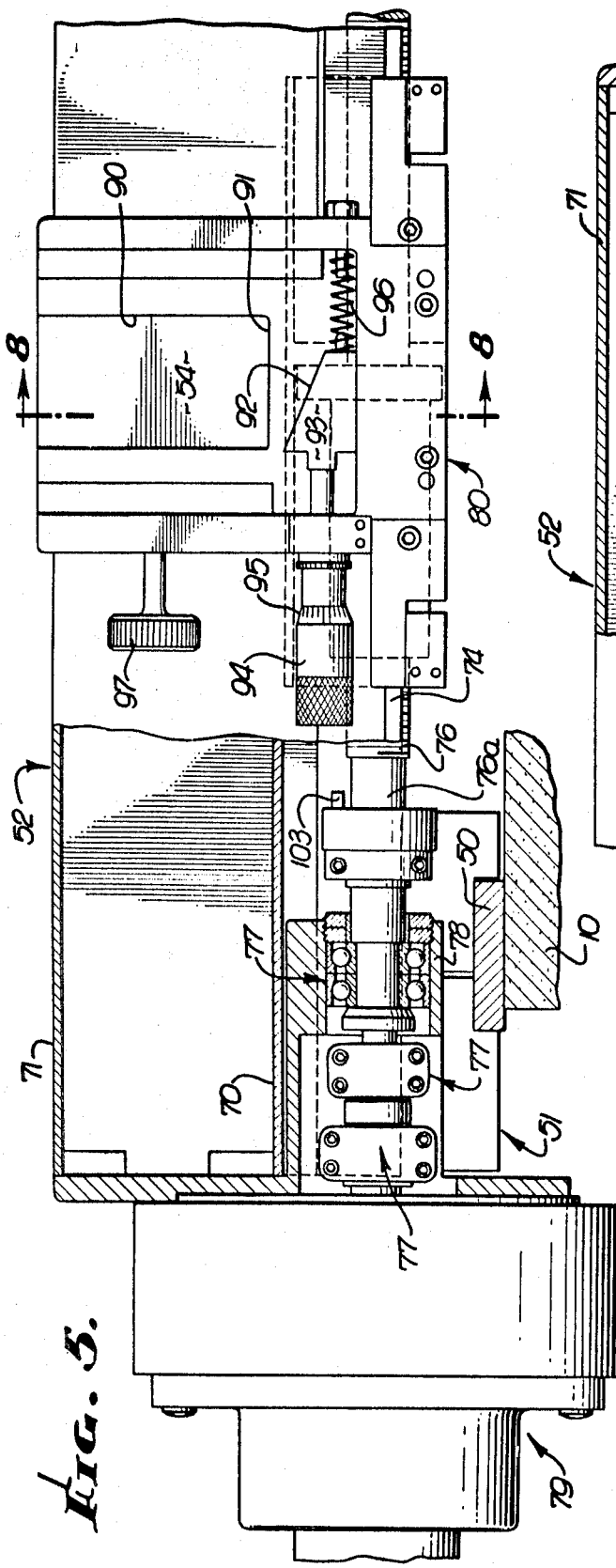

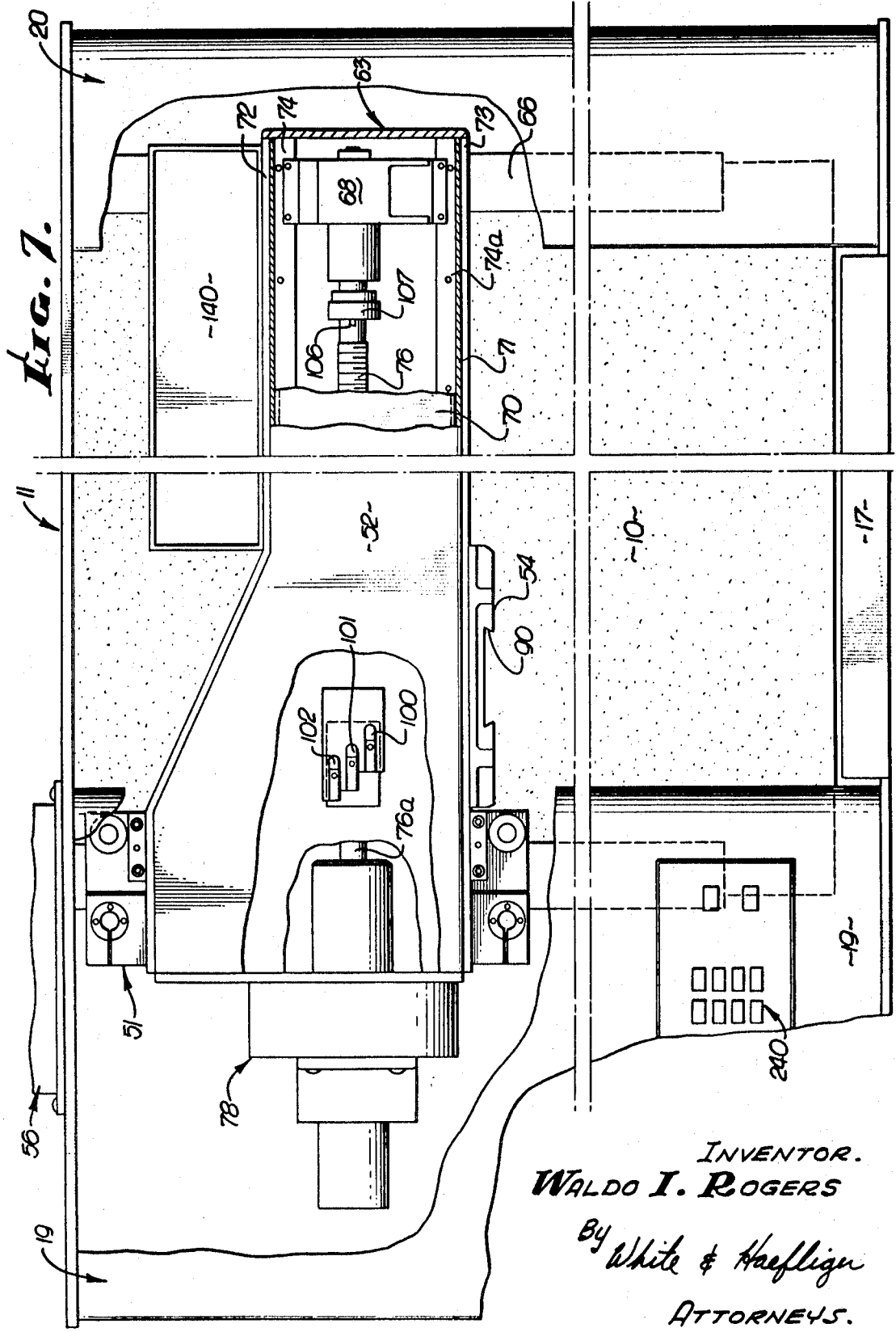

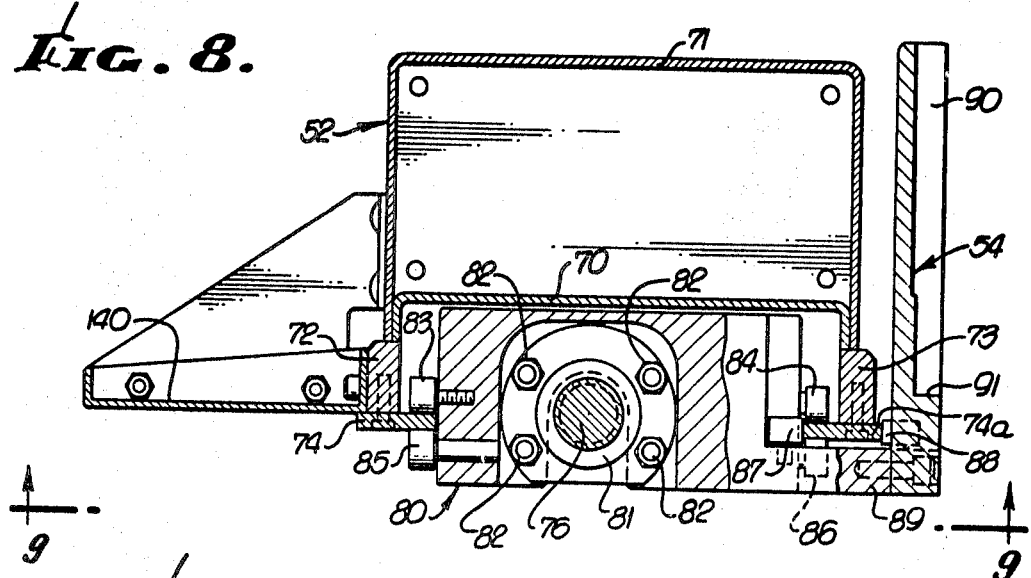

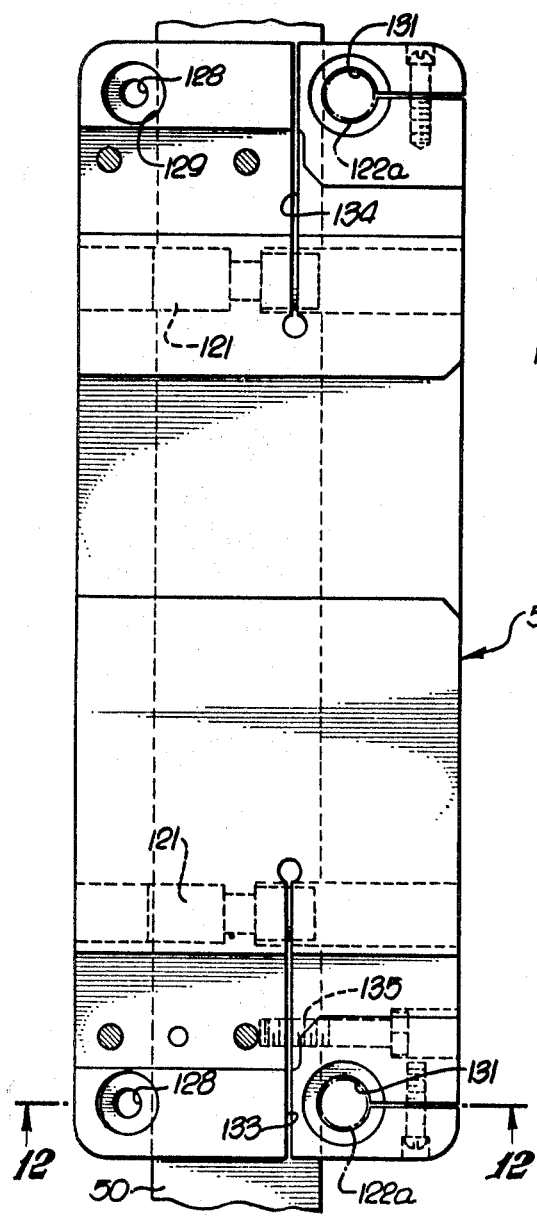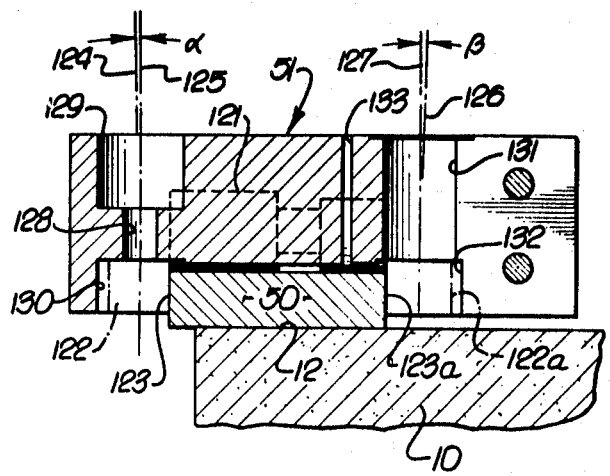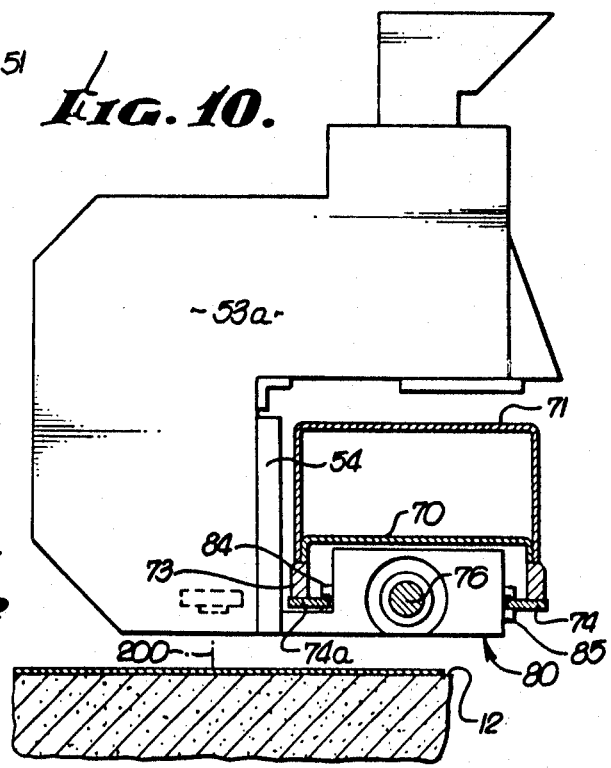

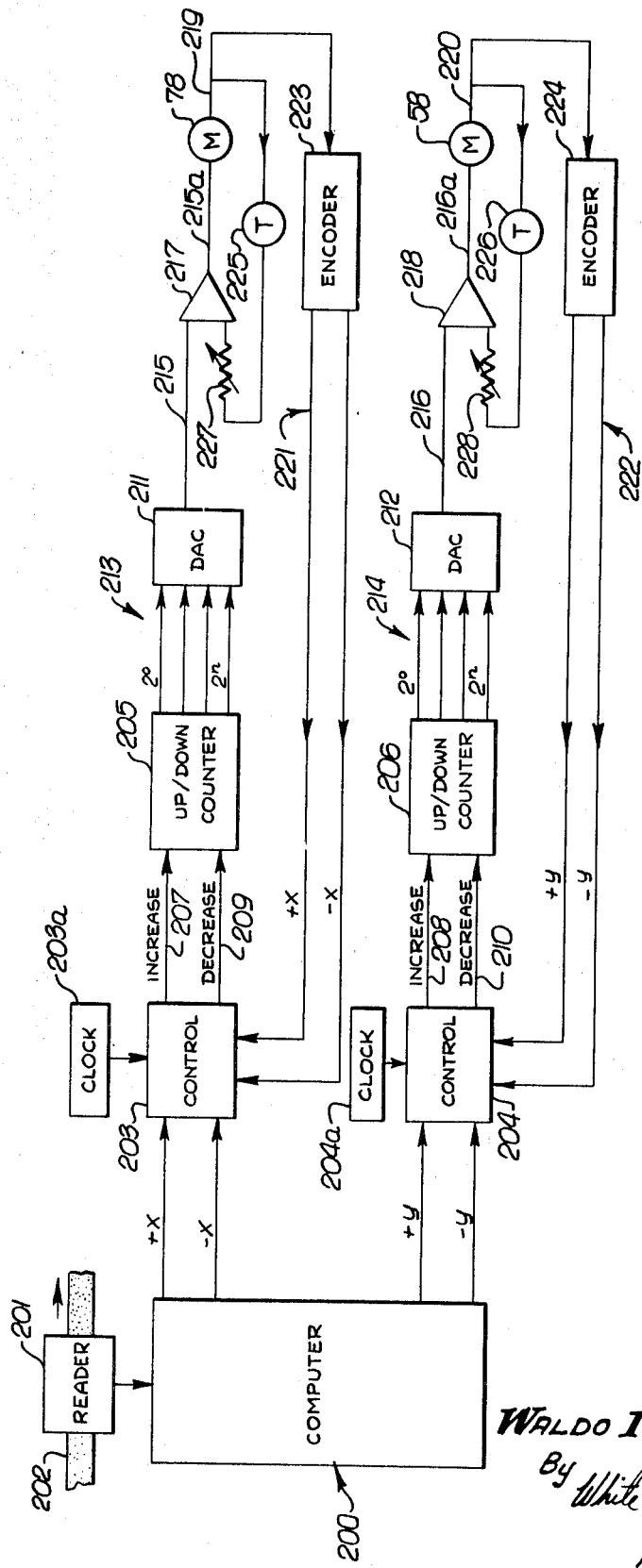

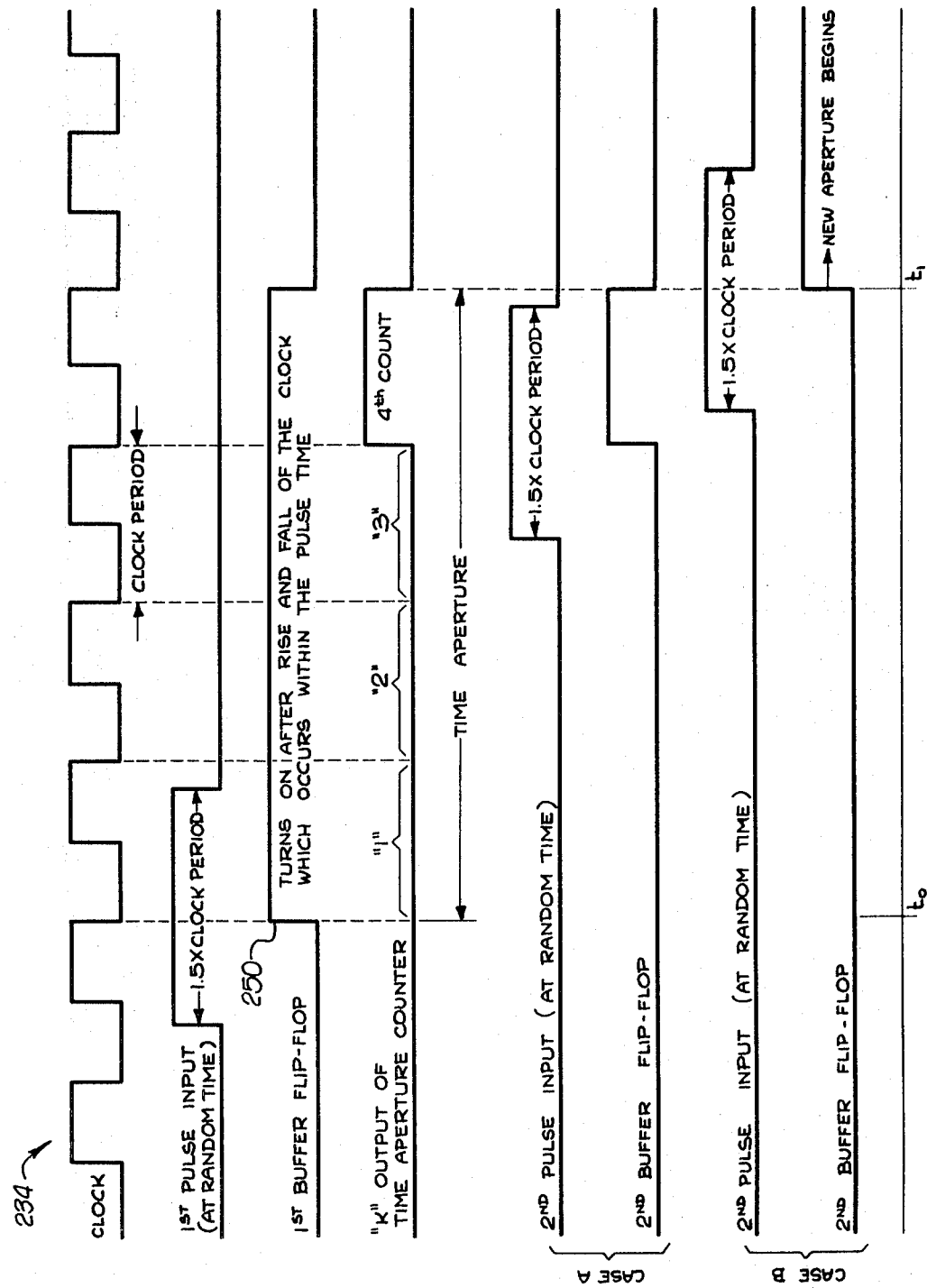

AUTOMATIC DRAFTING CONTROL

BACKGROUND OF THE INVENTION

This invention relates generally to the automatic control of drafting equipment, and more particularly concerns numerical control of drafting head movement in an x-y coordinate system wherein rapid and precise travel of the head to desired position, or over a range of positions (defining a curve or line) is achieved.

In the past, automatic drafting devices have suffered from various disadvantages including undesirable complexity, lack of sufficient precision of drafting head movement, the need for coarse and fine drive motors to control head movement in x and y direction, and the lack of various advantages and combinations of advantages which characterize the present apparatus.

SUMMARY OF THE INVENTION

It is a major object of the invention to provide an automatic control system for drafting equipment which overcomes the disadvantages associated with prior equipment. As respects x or y coordinate control, the invention is embodied in the combination which comprises: a drafting head; drive means including a servomotor having an output element connected to drive the head relatively over a drafting surface; director means to receive directing digital information and to operate thereon to provide a series of directing pulses corresponding to the coordinates of desired positions of the head relative to the drafting surface; a counter having digital output; a digital to analog converter connected to be responsive to counter digital output to produce an analog signal corresponding to the count in the counter, the motor being connected to be responsive to a directing version of the analog signal; feedback means responsive to the degree of movement of the servomotor element to produce a corresponding series of feedback pulses; and control apparatus including clock means connected to be responsive to the directing and feedback pulses to change the count in the counter so as to control the drive of the head to desired position. The functioning is such that the count in the counter may for example be suddenly increased in accordance with an increase in the supply of directing pulses indicating desired movement of the head to another position, and the count is then decreased by feedback pulses supplied as the head approaches that position. Further, such a control system may be incorporated with each of the x and y coordinate drive motors, as will appear.

A further object of the invention is to provide logic means responsive to reception of timewise nearly coincident directing and feedback pulses to provide an output which discriminates between such pulses in the control of clock pulse transmission to the counter. As will appear, such logic means may advantageously comprise time aperture defining means operable to define a time aperture characterized as longer than the sum of the durations of at least three clock pulses but less than the average interval between successive directing and feedback pulses; sensing means connected to sense the arrival within the time aperture of both directing and feedback pulses and their sign; bistable means characterized as controllably settable in response to directing and feedback pulse arrival; and means to control clock pulse delivery to the counter in accordance with the settings of the bistable means.

Another object of the invention concerns the provision of a driving amplifier for each of the x and y servomotors, the amplifier having two inputs one to receive the converter analog signal and to produce the directing version of the analog signal; and a generator responsive to rotation of the servomotor output element to produce a feedback analog signal applied to the input of the driving amplifier, thereby to stabilize or linearize the motor output.

These and other objects and advantages of the invention, as well as the details of an illustrative embodiment, will be more fully understood from the following detailed description, in which:

DESCRIPTION OF THE DRAWINGS

FIG. 1 is a plan view showing the drafting table;
FIG. 2 is an end elevation taken on line 2—2 of FIG. 1;
FIG. 2a is an enlarged section taken on line 2a—2a of FIG. 2;
FIG. 3 is a side elevation taken on line 3—3 of FIG. 1;
FIG. 4 is an enlarged elevation taken on line 4—4 of FIG. 1;
FIG. 4a is a horizontal view taken on line 4a—4a of FIG. 4;
FIG. 5 is an enlarged section taken on line 5—5 of FIG. 1;
FIG. 6 is an enlarged section taken on line 6—6 of FIG. 1;
FIG. 7 is an enlarged fragmentary plan view similar to FIG. 1;
FIG. 8 is a vertical section taken on lines 8—8 of FIG. 5;
FIG. 9 is a horizontal view taken on line 9—9 of FIG. 8;
FIG. 10 is an elevation showing a photoexposure head supported on the cross-slide carriage;
FIG. 11 is a plan view showing the carriage for the crossarm;
FIG. 12 is an elevation of the FIG. 11 carriage;
FIG. 13 is a block diagram showing the drafting head drive control;
FIG. 15 is a timing diagram.

DESCRIPTION OF PREFERRED EMBODIMENT

Figure 14:
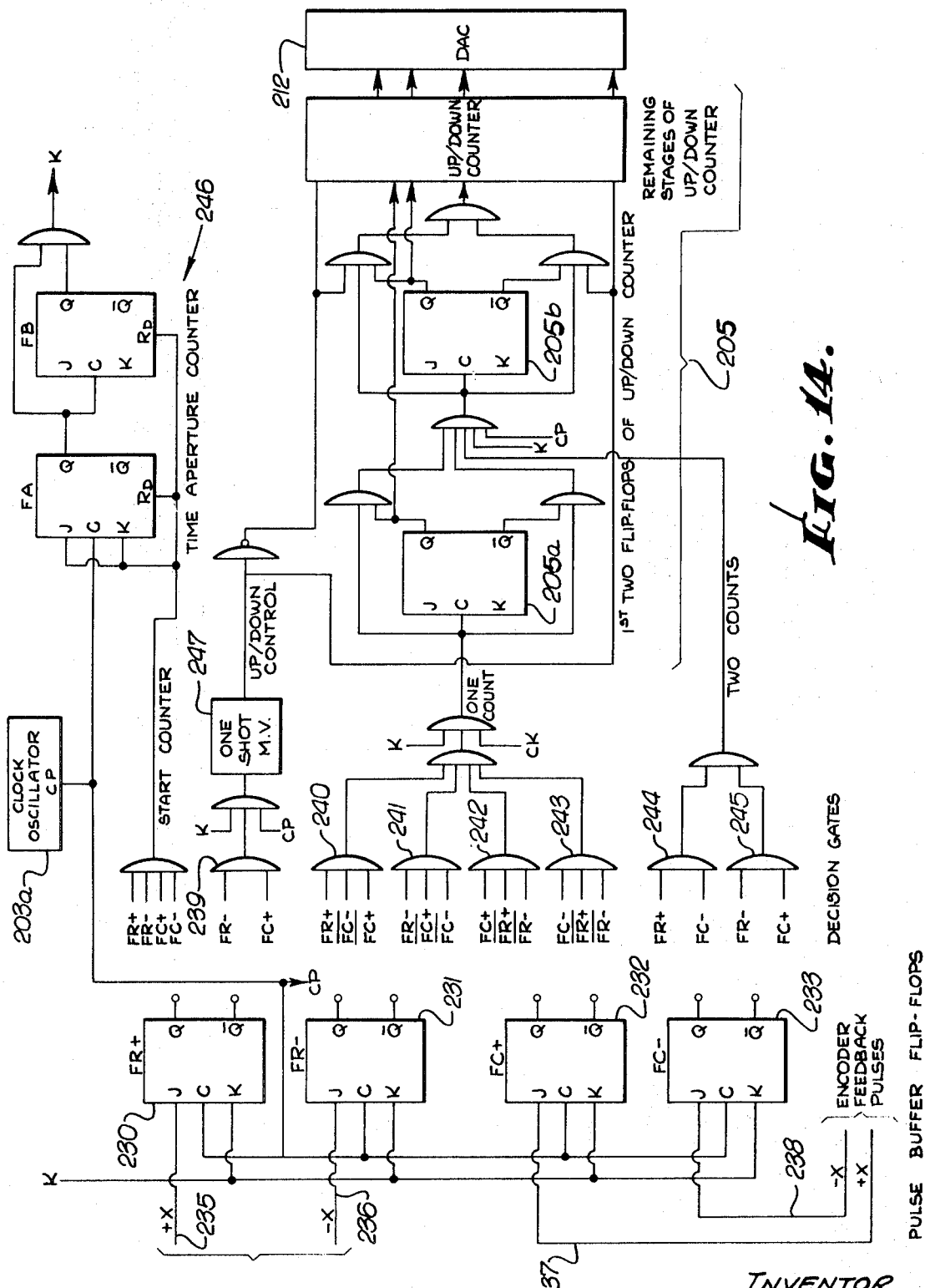
FIG. 14 is a circuit diagram showing a near coincident pulse discriminator.

Referring to FIGS. 1, 2, and 3, heavy rectangular stone block 10 is shown as supported by a metal frame 11. The block has a ground, lapped and polished upper surface 12 to receive a work sheet 13 such as paper or film upon which markings are to be produced, as for example by controlled local exposure of a photographic film sheet or by inscription upon a paper sheet. It has been determined that a black granite surface 12 affords that extreme temperature stability and uniformity needed for close tolerance marking of the work sheet. Also, such a surface is very easily cleaned. The heaviness of the stone block, which may for example be in excess of 3 inches thick, contributes to the vibration free character of the work surface 12.

The block is supported by the frame 11, as for example on three horizontally spaced discs 14 carried by frame channel members 15. Those members are in turn supported by legs 16 adjustable vertically for horizontal leveling of the block surface 12. Frame 11 also includes longitudinally spaced lateral members 17 and 18 extending at opposite ends of the block and supporting housing structure 19 and 20 at laterally opposite sides of the block. A lower portion 19a of the housing 19 receives the slide cabinets 21, 22 and 23 which respectively mount control structure such as a servo power supply 24, servocontrol unit 25 and a lamp power supply 26. Electrical power cables for such control structure are seen at 27 in FIG. 3.

Apparatus for accurately guiding the automatically controlled guiding head over the drafting surface will first be described. In this regard, there is provided in combination with frame 11 and table 10 an elongated linear way such as seen in FIGS. 1, 5, 7, 11 and 12, carried by the assembly; a carriage movable along that way in gripping engagement with same for guiding carriage movement, an illustrative carriage being indicated at 51; a cantilever unit as at 52 supported at one end by the carriage to project laterally over the table surface 12; means to drive the carriage along the linear way; and marking head means (as for example the head 53) supported at 54 on the cantilever unit to produce markings on the work sheet. In this regard, the marking head may comprise a multiple pen turret, one advantageous form of which is described in that certain David C. Kramer, et al. application for U.S. Letters Patent, Ser. No. 724,183 filed on Apr. 25, 1968, now U.S. Pat. No. 3,550,276, for producing pen inscribed markings on a work sheet as the head is moved laterally and longitudinally; FIG. 2a shows a pen turret at 201 and pen 202. As another alternative, the marking head may comprise a photoexposure device wherein a beam of light is directed downwardly for exposing portions of a sheet of film, as described in that certain Armin J. Hill application for U.S. Letters Patent Ser. No. 717,159, filed on Mar. 29, 1968. FIG. 16 herein indicates the general outline form of such a photoexposure device at 53a, producing a directed beam at 200.

The referred to means to drive the carriage longitudinally may advantageously include a lead screw 55 driven in rotation by a servo-controlled drive motor 56 through a coupling that includes a bellows 57, as seen in FIGS. 4 and 4a. Suitable bearing support for the screw is provided at 58 and 59, such structure being attached at 60 and 61 to the side 62 of heavy block 10 so as to benefit from block stability.

It will be appreciated that the opposite end of cantilever unit 52, that is end 63 remote from the way 50 and drive screw 55, is neither guided horizontally nor driven during longitudinal translation thereof, the sole driving force originating at screw 55. As a result, there is no possibility for the creation of "racking" or "backlash" in the movement of the cantilever unit, whereby the marking had is not subjected to erratic movement which would result from such racking or backlash. This benefit is given further implementation through the provision of a second elongated way, as at 66, carried by the assembly and spaced laterally from way 50 to receive weight imposed by cantilever unit 52. In this regard, a roller 67 carried by unit 52 engages the top of way 66 and simply rolls therealong as the unit 52 is displaced longitudinally, the sole function of the roller being to transmit loading from unit 52 to way 66. Roller 67 is suitably carried by the terminal structure 68 of unit 52, as seen in FIG. 11.

Referring to FIGS. 5, 7 and 8, arm unit 52 may advantageously include a frame comprising horizontal inverted channel members 70 and 71 forming a housing attached to horizontal beams 72 and 73. The latter carry a pair of ways 74 and 74a which extend laterally and are spaced longitudinally. Terminal structure 68 is attached to the beams 72 and 73, and carries bearings 75 which in turn support one end of a laterally extending lead screw 76 for rotation beneath the lower channel 70. The opposite end of that screw is supported by bearings 77 carried by terminal structure 78 in the carriage 51. A rotary drive, servo-controlled, for lead screw 76 is indicated at 78 as supported by unit 52, the latter also supporting a tray 140.

A laterally movable carriage 80 extends generally beneath channel member 70 and is connected to screw 76 to be driven laterally thereby, as by means of a nut 81 threaded on screw 76 and fastened at 82 to the carriage 80, as seen in FIG. 9. That carriage is accurately guided for travel along ways 74 and 74a as by means of rollers 83 and 84 engaging the tops of those ways; rollers 85 and 86 engaging the undersides of those ways; and rollers 87 and 88 engaging opposite edges of way 74a. All such rollers are carried by the carriage, as indicated. The carriage 80 projects at 89 from beneath the way 74a for attachment to a mount 54 for the marking head. The advantageous mount shown has dovetailed vertical recesses at 90 to interfit matching tongues on the head when dropped into place, a stop shoulder 91 on the mount seating the head for vertical locating purposes. If desired, the head may be adjusted vertically, as by means of the taper 92 on wedge block 93, the latter being horizontally movable under the control of an actuator 94 having a screw with vernier 95. A spring 96 acts as a return for the block 93, all of such structure being carried by the mount 54 as seen in FIG. 5. A tightening knob 97 is operable to lock the head in position on the mount.

As the carriage 80 travels to the left in FIG. 7 it may successively engage or actuate a "slow-down" switch 100, a "0-0" switch 101 and a "STOP" switch 102, such switches being electrically connected to the drive 78 for deactivating same. As a last resort, the carriage will strike a limit stop 103 provided on a collar 104 on screw shaft 76a. Similarly, as the carriage moves to the right, it ultimately actuates a limit switch 105 to deactivate the drive. A safety stop 106 on collar 107 acts as a last-resort stop.

Turning back to FIG. 4, it will be seen that longitudinal travel carriage 51 is advanced as by means of a nut 110 threaded on screw 55 and attached to that carriage. Structure on the latter may successively operate the "slow-down," "0-0," and "safety-stop" switches 111, 112 and 113 connected to drive 56, as the carriage approaches the last resort stop 114 on collar 115. A single safety stop switch 116 serves to deactivate the drive as the carriage travels to the right in FIG. 4, and a last resort stop appears at 117 on collar 118.

Referring to FIGS. 7, 11 and 12, the carriage 51 is shown as comprising an elongated body 120 supporting top rollers 121, rollers 122 to engage one side 123 of way 50, and rollers 122a to engage the opposite side 123a of that way. Rollers 122 have their axes 124 offset at a slight angle and from a plane 125 parallel to side 123 of the way; and rollers 122a have their axes 126 offset at a slight angle from a plane 127 parallel to side 123a of the way. Bores and counter bores to receive the roller mounts and rollers are seen at 128–132. It will also be noted that the carriage body contains longitudinal splits 133 and 134 between the rollers 122 and 122a of each pair. In this regard, an adjustable tensioning member as for example a threaded fastener 135, extends between the sections of the body at laterally opposite sides of each split to exert force acting to deflect those cantilever beam sections toward one another, thereby to cause the rollers 122 and 122a to forcibly grip the opposite sides of the way. The rollers themselves have such taper that their faces are brought into flat engagement with the way sides 123 and 123a only after slight bending deflection of the rollers relative to their mounts in response to tightening of the fasteners 135 to create the gripping action referred to. As a result, when the carriage moves along the way, there is no resultant looseness, either horizontally or vertically, the carriage tending to pull down toward the way due to the forces created. Rollers 121 spaced along the carriage and carried thereby engage the top of the way and transmit thereto part of the weight of the unit 52. Angles $\alpha$ and $\beta$ may each typically be less than about 1 degree, and the taper angularity of each of the rollers 122 and 122a may be less than about 2 degrees.

Finally, FIG. 1 and 7 illustrate the provision of a control panel 240 on the structure 19, and operate in conjunction with the controls 141 (seen in FIG. 3) to command and control operation of the longitudinal and lateral drives as well as the marking head. One such control for the head is described in the above referred to Kramer, et al. application. Manual or automatic control buttons appear at 142 and 143. Button 144 activates the timed exposure functioning of the photoexposure disc 53a. A main power control is seen at 147 and the drives for the marking head may be deactivated at any time by pushing button 148. Power to the photoexposure head 53a is controlled by button 149; and up and down status of the multiple pens at head 53 may be controlled by buttons 150 and 151.

Referring now to FIG. 13, a computer is indicated at 200 to receive directing digital data or information, as for example from a punched paper tape reader 201, the tape being indicated at 202. Other devices for supplying digital information to the computer may of course be used. One highly suitable computer for this purpose is disclosed in U.S. Patent 3,254,203 to Kviem (see FIG. 11). The computer, which may be considered as a director, provides a series of directing output pulses corresponding to the coordinates of desired positions of the head 53 relative to the drafting surface. For example, the direction may typically produce first and second series of directing pulses, the first series being indicated by the +x and —x directing outputs to control the "x" coordinate servomotor 78 and the second series indicated by the +y and —y directing outputs to control the "y" coordinate servomotor 58.

First and second count controllers are indicated at 203 and 204 as receiving the directing pulses, and first and second bidirectional counters 205 and 206 have increase connections at 207 and 208 with the respective controllers, and decrease connections at 209 and 210 with the respective controllers. Accordingly, signals on connections 207 and 208 cause the counters to count up, and signals on the connections 209 and 210 cause the counters to count down.

First and second digital to analog converters are provided at 211 and 212 and connected at 213 and 214 with the respective counters to be responsive to counter digital outputs for producing first and second analog signals at 215 and 216 corresponding to the counts in the counters. Connections 213 and 214 are represented by the parallel binary input channels $2^0$–$2^n$ shown. Typically, the converters may include binary registers incorporating flip-flops connected to be driven by the counters, the flip-flops controlling switches in voltage divider networks.

The servomotors 58 and 78 are connected to be responsive to directing versions of the analog signals 216 and 215 respectively. For example, driving amplifiers 217 and 218 are typically provided to receive the signals 215 and 216 and provide amplified versions 215a and 216a thereof, such amplifiers and the motors being considered as the drive means for the drafting head.

Also provided are first and second feedback means responsive to the degree of movement of the first and second shaft or rotary output elements (at 219 and 220) of the servomotors 78 and 58 respectively, to produce first and second series 221 and 222 of feedback pulses. Such feedback means may for example comprise encoders 223 and 224 producing $+x$ and $-x$ feedback pulses supplied to the control 203, and $+y$ and $-y$ feedback pulses supplied to the control 204. In this regard, controller 203 may be considered to include a lock 203a and is connected to be responsive to both directing and feedback $+x$ and $-x$ pulses to change the count in counter 205 so as to control the drive of the drafting head 53 incrementally in the $x$-direction to desired position; and likewise, controller 204 may be considered to include a clock 204a, and is connected to be responsive to both directing and feedback $+y$ and $-y$ pulses to change the counter 206 so as to control the drive of the drafting head 53 incrementally in the $y$-direction to desired position. The functioning is such that the count in the counter may be suddenly increased in accordance with an increase in directing pulses indicating desired movement of the head to another position, and the count is decreased by the feedback pulses as the head moves to that position.

A tachometer or generator 225 is connected in feedback relation between the output of motor 78 and input to amplifier 217 to produce a feedback analog signal operating to stabilize or linearize the output of the motor; likewise a tachometer 226 is connected between the output of motor 58 and the input to amplifier 218. Gain adjustment potentiometers 227 and 228 are connected in these respective loops.

Finally, an important aspect of the invention concerns the provision within each of the controls 203 and 204 of logic means responsive to reception of timewise nearly coincident directing and feedback pulses to provide a clock pulse controlling output discriminating between such nearly coincident pulses. Such logic means may typically comprise time aperture defining means operable to define a time aperture characterized as longer than the sum of the durations of at least one (but preferably three or more) clock pulses, but less than the average interval between successive directing and feedback pulses; sensing means connected to sense the arrival within the time aperture of both directing and feedback pulses and their signs; bistable means characterized as controllably settable in response to such directing and feedback pulse arrival; and means to control clock pulse delivery to the counter in accordance with the settings of the bistable means.

In the example seen in FIG. 14 a more detailed diagram of the control 203 of FIG. 13 is presented. Pulses from either the computer or the encoder arrive at the pulse buffers 230–233 at random times. However, these can never be both plus and minus pulses from either the computer or the encoder occurring any closer to each other in time than five clock periods indicated at 234 in FIG. 15. Furthermore, there can never be consecutive pulses from any single source (235–238) which are closer together than five clock periods. The following table illustrates the possibilities of pulses arriving at the pulse buffer flip-flops 230–233 within this "simultaneous" definition. (In this regard, the counter is indicated at 205):

| "Simultaneous" pulse arrivals | | | | Desired VP/DN counter action |
|---|---|---|---|---|
| Computer | | Encoder | | |
| FR+ | FR− | FC+ | FC− | |
|  |  |  | X | No pulses—do nothing. |
|  |  |  | X | Count 1 up. |
|  | X |  |  | Count 1 down. |
|  | X |  | X | Do nothing. |
|  |  | X |  | Count 1 down. |
|  | X | X |  | Ignore—can't happen. |
|  | X | X |  | Count 2 down. |
|  | X | X | X | Ignore—can't happen. |
| X |  |  |  | Count 1 up. |
| X |  |  | X | Count 2 up. |
| X | X |  |  | Ignore—can't happen. |
| X | X |  | X | Do. |
| X |  | X |  | Do nothing. |
| X |  | X | X | Ignore—can't happen. |
| X | X | X |  | Do. |
| X | X | X | X | Do. |

From the above table one can list the cases where the counter must go up or down, and whether it should be incremented 1 count, 2 counts or 0.

one count =
$$(FR+)(\overline{FC-})(\overline{FC+})+(FR-)(\overline{FC+})(\overline{FC-})$$
$$+(FC+)(\overline{FR+})(\overline{FR-})+(FC-)(\overline{FR+})(\overline{FR-})$$

two counts = $(FR+)(FC-)+(FR-)(FC+)$ countdown = FR−+FC− count up = all other times

The above logic is implemented by the decision gates 239–245 of FIG. 14, connected between the flip-flops 230–233 and the counter 205, as shown.

The sequence of operation of FIG. 14 is as follows:
1. The clock oscillator 203a is running at all times.
2. When any pulse (or pulses) arrive, at least one of the pulse buffer flip-flops is set to the "true" condition.
3. This allows the "time aperture counter" 246 to count, thus defining the time aperture.
4. Sometime before the end of the time aperture (i.e., four counts of the counter) there will have been set up some condition in the decision gates to determine "up or down" and "one count, two counts, or do nothing."
5. The change from true to false of the fourth clock pulse causes three things to happen via terminal K:
   a) Toggles either the first or the second flip-flop 205a and 205b of the VP/DN counter, depending on whether one or two counts are desired.
   b) Triggers one-shot multivibrator 247, if the count is to be down.
   c) Resets the buffer flip-flops.
6. The control is now ready to accept another pulse, or pulses.

FIG. 15 shows a typical timing diagram and clarifies the above described sequence.

The pulse periods are 1.5 times the clock period to assure that any pulse arriving at a random time will coincide with at least one clock period. Notice that the first pulse to arrive allows the time aperture counter to begin counting, at time to and sets the first buffer flip-flop.

There are two basic cases: case A, in which the second pulse arrives within the time aperture; and case B, in which the second pulse arrives too late to be considered within the time aperture.

In case A, there are two buffer flip-flops true at the fall time $t_1$ of the fourth clock pulse of the time aperture, and the logic decision is made according to the above description.

In case B, the time aperture ends at $t_1$ with only the first buffer flip-flop being true, and the logic decision is one of the "one-pulse" cases. The pulse, which arrived too late to be considered within the aperture, is accounted for since it causes the beginning of a new aperture.

Therefore, if two pulses occur "nearly simultaneously" they are accounted for so that the accuracy of the drafting machine is not impaired due to "lost" pulses.

I claim:

1. In a drafting machine, the combination comprising
a. a drafting head,
b. drive means including a servomotor having an output element connected to drive said head relatively over a drafting surface,
c. director means to receive directing digital information and to operate thereon to provide a series of directing pulses corresponding to the coordinates of desired positions of the head relative to the drafting surface,
d. a counter having digital output,
e. a digital to analog converter connected to be responsive to counter digital output to produce an analog signal corresponding to the count in the counter, said motor being connected to be responsive to a directing version of said analog signal,
f. feedback means responsive to the degree of movement of said element to produce a corresponding series of feedback pulses, and
g. control apparatus including clock means connected to be responsive to said directing and feedback pulses to change the count in the counter so as to control the drive of the head to said desired position,
h. said control apparatus including logic means responsive to reception of timewise nearly coincident directing and feedback pulses to provide an output discriminating said nearly coincident pulses and operable to control passage of clock pulses to said counter.

2. The combination of claim 1 wherein said logic means comprises time aperture defining means operable to define a time aperture characterized as longer than the sum of the durations of at least one clock pulse but less than the average interval between successive directing and feedback pulses, sensing means connected to sense the arrival within said time aperture of both directing and feedback pulses and their sign, bistable means characterized as controllably settable in response to said pulse arrival, and means to control clock pulse delivery to the counter in accordance with the settings of said bistable means.

3. The combination of claim 2 wherein said logic means includes flip-flops connected to be set in response to arrival of said nearly concurrent pulses within a predetermined time interval of less duration than the normal interval between successive directing pulses, and gates responsive to the settings of said flip-flops to control clock pulse delivery to the counter.

4. The combination of claim 1 wherein said drive means includes a driving amplifier having two inputs one to receive said converter analog signal to produce said directing version of the analog signal, and a generator responsive to rotation of said servomotor output element to produce a feedback analog signal applied to the other input of the driving amplifier.

5. In a drafting machine, the combination comprising
a. a drafting head,
b. drive means including a first servomotor having a first output element connected to drive said head relatively over said drafting surface in a first direction, and a second servomotor having a second output element connected to drive said head relatively over said drafting surface in a second direction,
c. director means to receive directing digital information and to operate thereon to provide first and second directional coordinates of desired positions of the head relative to said drafting surface,
d. first and second digital counters having digital output,
e. e) first and second digital to analog converters connected to be responsive to first and second counter digital outputs respectively thereby to produce first and second analog signals corresponding to the counts in the first and second counters respectively, said first and second motors being connected to be responsive to directing versions of said first and second analog signals respectively,
f. first and second feedback means responsive to the degree of movement of said first and second elements respectively to produce corresponding first and second series of feedback pulses, and
g. control apparatus including clock means connected to be responsive to said first and second series of directing and feedback pulses to change the counts in said first and second counters so as to control the drive of said head incrementally in said directions to said desired positions.
h. said control apparatus including logic means responsive to reception of timewise nearly coincident directing and feedback pulses to provide output discriminating said nearly coincident pulses and operable to control passage of clock pulses to said counters.

6. The combination of claim 5 wherein said machine includes a table in the form of a block, and said servomotors are mounted on said block.

7. The combination of claim 6 wherein said first and second output elements comprise elongated lead screws extending in said first and second directions, respectively, there being a carriage displaced in said first direction in response to rotation of the first lead screw, and said second servomotor being carried by said carriage.

8. In a drafting machine, the combination comprising:
a. a drafting head,
b. drive means including a motor having an output element connected to drive the head relatively over a drafting surface,
c) director means to receive directing digital information and to operate thereon to provide a series of directing pulses corresponding to the coordinates of desired positions of the head relative to the drafting surface,
d) a counter having digital output,
e) means connected to be responsive to counter digital output for controlling the motor,
f) feedback means responsive to the degree of movement of said element to produce a corresponding series of feedback pulses, and
g) control apparatus connected to be responsive to said directing and feedback pulses to change the count in the counter so as to control the drive of the head to said desired position,
h) said control apparatus including logic means responsive to timewise nearly coincident directing and feedback pulses to provide an output discriminating said nearly coincident pulses and operable to control passage of pulses to the counter.